United States Patent [19]

Carter, Sr.

[11] Patent Number: 4,560,196
[45] Date of Patent: Dec. 24, 1985

[54] MOTORCYCLE CONVERTIBLE TOP

[76] Inventor: Richard L. Carter, Sr., 226 Birch Ave. Elsmere, Wilmington, Del. 19805

[21] Appl. No.: 610,477

[22] Filed: May 15, 1984

[51] Int. Cl.$^4$ .............................................. B62J 17/08
[52] U.S. Cl. .............................. 296/102; 280/289 S; 135/88; 343/713
[58] Field of Search ................. 296/78 R, 78.1, 102, 296/104, 105; 280/289 S; 135/88; 343/711–713, 715

[56] References Cited

U.S. PATENT DOCUMENTS

| | | | |
|---|---|---|---|
| 988,349 | 4/1911 | Jolley | 135/88 |
| 2,182,484 | 12/1939 | Mills | 343/712 |
| 2,400,551 | 5/1946 | Hings | 343/712 |
| 3,707,977 | 1/1973 | Grady | 135/88 |
| 4,132,994 | 1/1979 | Caldwell | 343/713 |
| 4,166,650 | 9/1979 | Saunders | 296/78.1 |
| 4,440,436 | 4/1984 | Giddens et al. | 296/78.1 |

FOREIGN PATENT DOCUMENTS

| | | | |
|---|---|---|---|
| 2947171 | 5/1981 | Fed. Rep. of Germany | 296/78.1 |
| 466986 | 11/1951 | Italy | 296/78.1 |
| 511934 | 1/1955 | Italy | 296/78.1 |

*Primary Examiner*—Robert B. Reeves
*Assistant Examiner*—Dennis H. Pedder
*Attorney, Agent, or Firm*—Abramo & Abramo

[57] ABSTRACT

A convertible cover for bicyclic-type vehicles, including a motorcycle and bicycle, which protects the rider from the elements. The cover can be raised or lowered to suit the rider. The main support members of the cover are flexible rods attached to and extending from the rear of the vehicle over to the front steering means of the device, and releasing the rods from the front end of the vehicle and lowering the cover allows the use of the vehicle without a cover.

4 Claims, 14 Drawing Figures

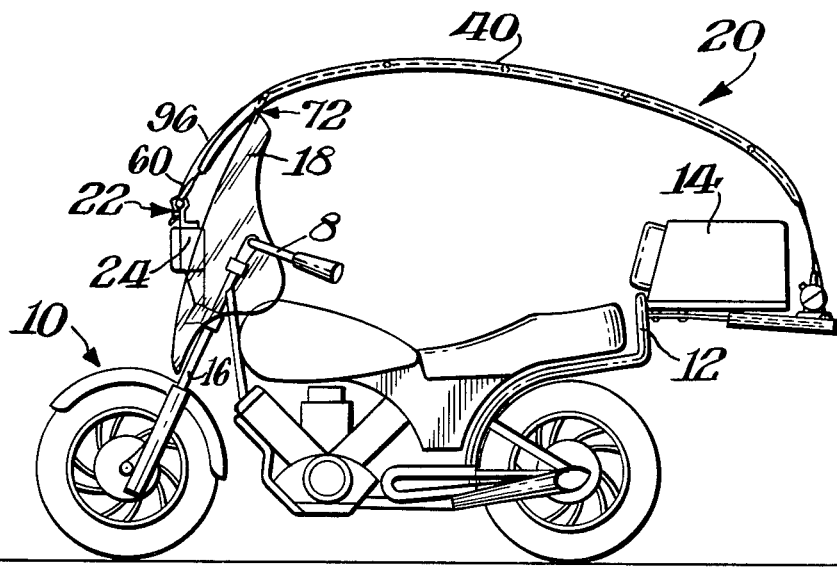
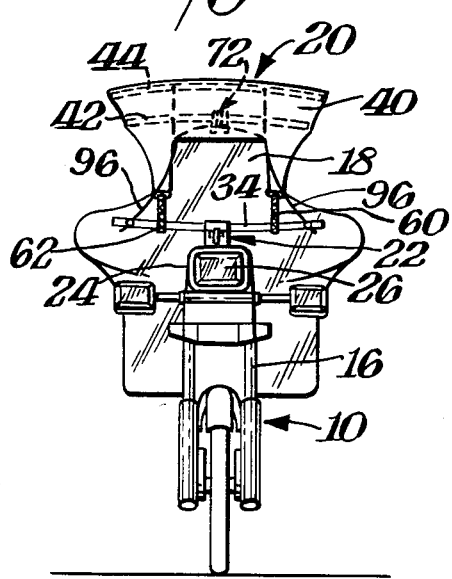
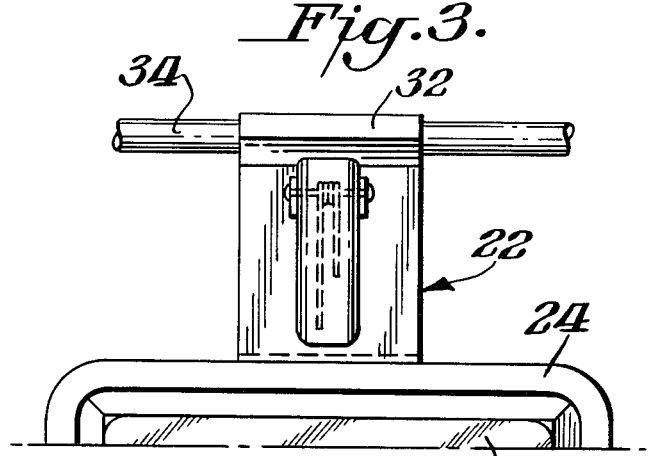
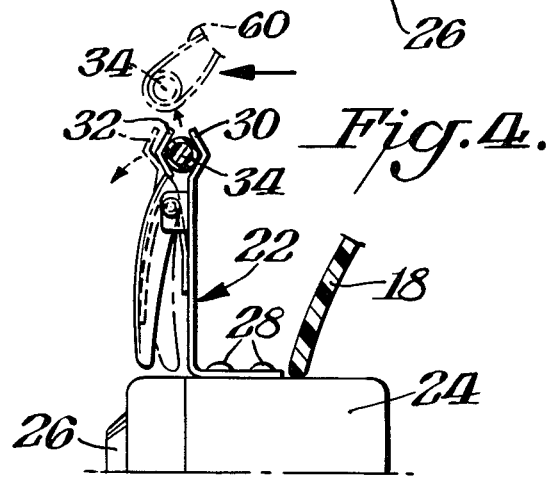

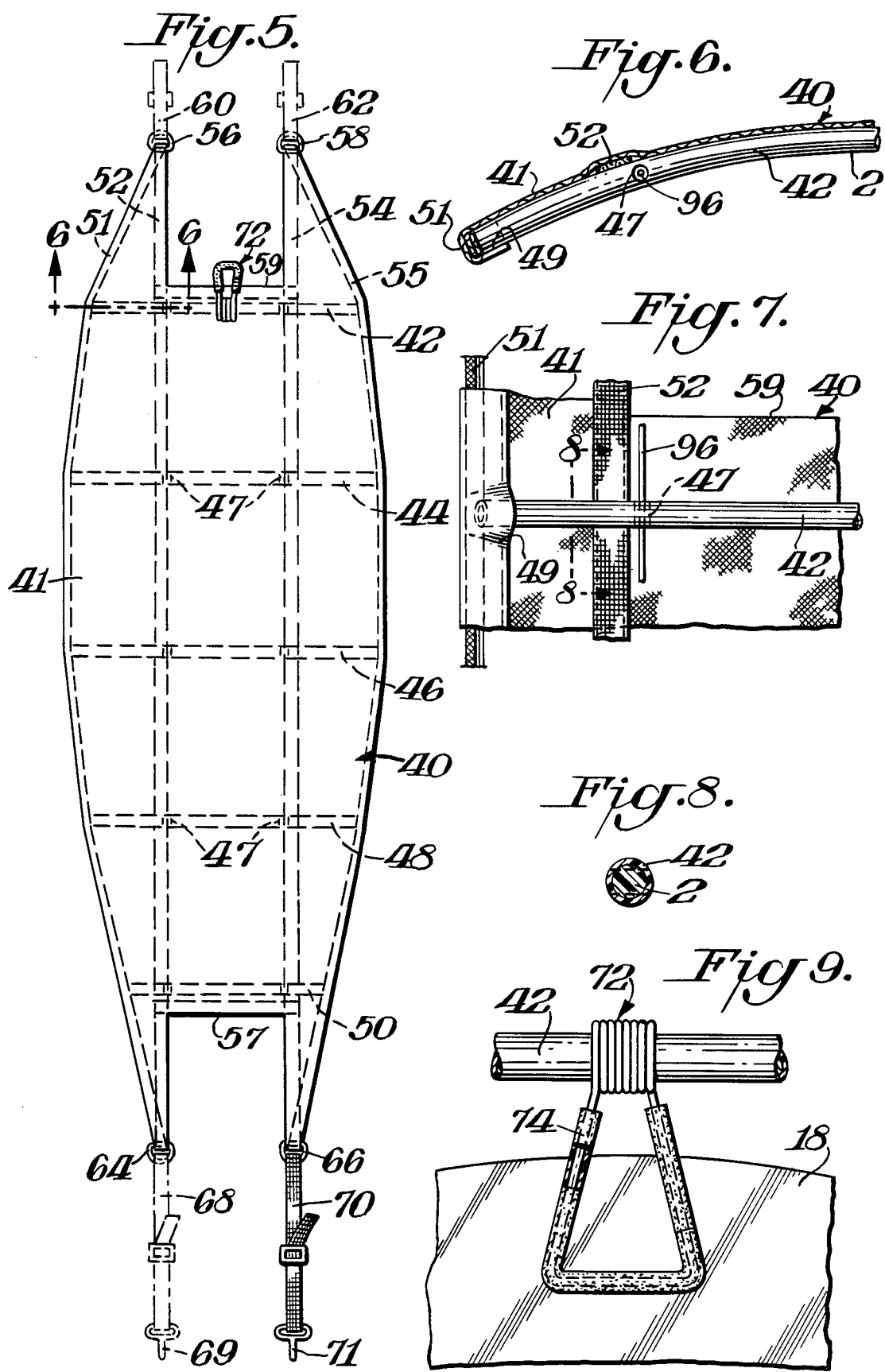

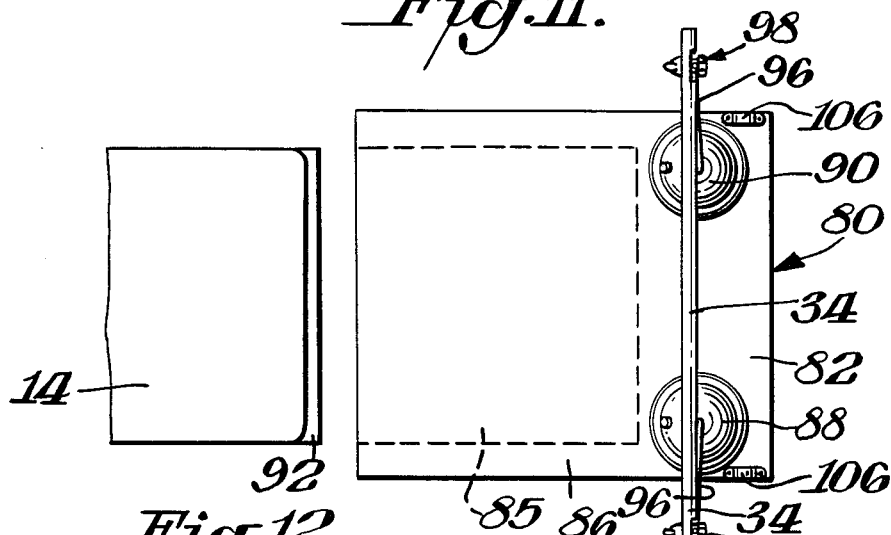
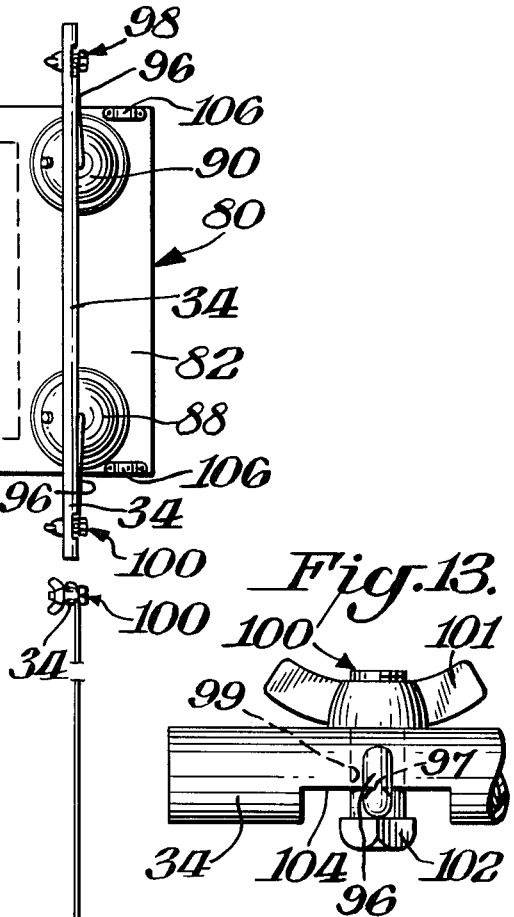
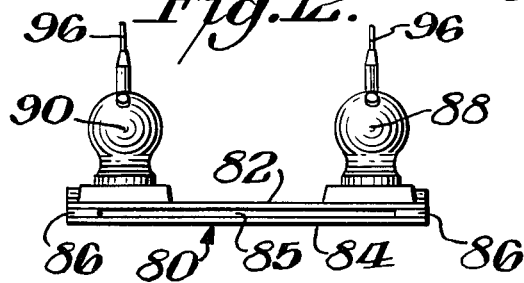
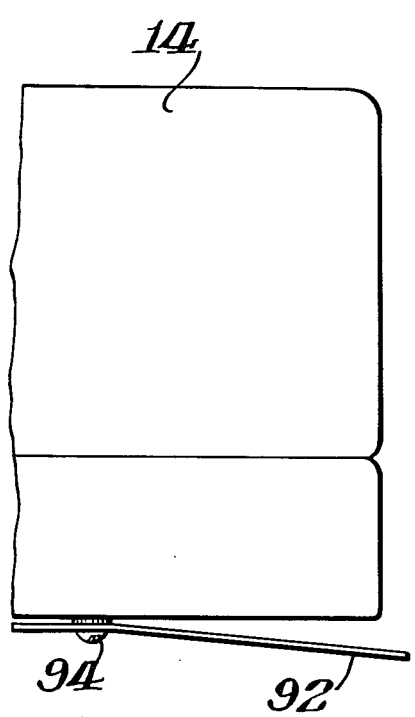
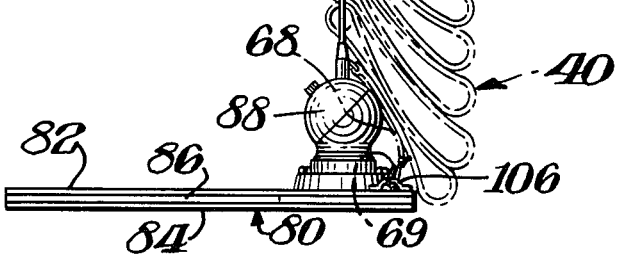

MOTORCYCLE CONVERTIBLE TOP

BACKGROUND OF THE INVENTION

Motorcycles and bicycles are cyclic-type vehicles in which the operator is usually exposed to the elements.

Covers have been devised for these cyclic-type vehicles, but, for the most part, they all suffer from deficiencies which limit their usefulness.

Lester, in U.S. Pat. No. 582,070 issued in 1897, describes an attachment or device for attaching an umbrella to a bicycle frame. The invention is a clamp which attaches to the rear frame of the bicycle and holds an umbrella over the rider. The device is stated to allow the rider to obtain protection from the sun. It would not shield a rider from rain if the bicycle was moving forward because the only protection provided is directly overhead.

Hannum, in U.S. Pat. No. 702,003, issued in 1902, describes a device which is attached to the front forks of a bicycle and extends over the head of the rider. A fan attachment is provided in the top of the device which helps to cool the rider by directing air downward. The device also provides shielding from the sun.

More recently, Michael, in U.S. Pat. No. 3,284,130, issued Nov. 8, 1966, describes a motorcycle spray-shield and windshield. The structure described by him is a framework which includes a windshield and a ribbed structure that extends behind the rider. The canopy that is used with the device is manually attached to the frame with snaps positioned along the periphery of the canopy. When the canopy is not in use, it must be unsnapped from the frame and stored until it is needed again. Then the operator must again laboriously attach the canopy to the framework by means of the snaps previously mentioned. If the operator desires to remove the device, the windshield and canopy frame must be removed at the same time. In addition, removal of the ribbed structure from the motorcycle frame requires the use of wrenches or other mechanical aids. Since the structure is bolted on and there is no provision for its release in the case of an accident, the operator could be injured if he is thrown against the rigid cross-members of the framework.

Kelley, in U.S. Pat. No. 3,979,147, issued Sept. 7, 1976, describes a manually detachable rigid transparent cover which encloses the entire motorcycle and acts both as a windshield and as a cover.

DeVone, in U.S. Pat. No. 4,045,077, issued Aug. 30, 1977, describes a transparent cover for a bicycle which is the above mentioned device by Kelley above.

Hickman, in U.S. Pat. No. 4,066,291, issued Jan. 3, 1978, describes a flat structure which after it is attached to the top of a motorcycle windshield extends partially over the head of the rider. It provides cover to the rider from the elements while the vehicle is in motion but once the motorcycle has stopped or slowed the device fails to cover the operator's back and the rest of his body.

Finally, Tatch, U.S. Pat. No. 4,326,728, issued Apr. 27, 1982, describes a cover for a bicycle which is used to enhance the aerodynamic travel capacity of the bicycle. The device appears to be primarily directed to the aerodynamic problems involved in riding a bicycle and very little is mentioned in the specification concerning the protection of the rider from the elements. It is a rigid cover similar to the one described by Kelley above.

It will be seen from the foregoing that a need exists for an inexpensive collapsible cover which could be stored on a motorcycle until such time as the rider felt cover was needed and then be able to be available and easily raised into position. It would also be desirable to provide the cover with means that would allow it to fly out of the way when the motorcycle hits something so that the rider is not hurt on the frame.

SUMMARY OF THE INVENTION

The invention disclosed and claimed herein is directed to a convertible top for bicycle-type vehicles which can be raised and lowered as desired by the vehicle operator without removal of the framework. The convertible top is also detachably mounted so that it can be removed and stored. The convertible top has base means that engage rear monting means which is permanently mounted to the frame of the bicycle-type vehicle behind the seat. When removal and storage of the convertible top is desired, the base means is disengaged from the rear mounting means and the convertible top is then stored. The convertible top structure involves flexible rods mounted on the base means. The rods are mounted so they extend vertically from the rear of the vehicle when the base means is engaged in the rear mounting means and, when the rods are flexed forward and attached to the front of the vehicle, they form twin accurate members that extend above the head of a rider on the seat of the vehicle. The flexible rods are held together in parallel relationship by a cross-member at the other end of the rods. The cross member is attached to the front steering means of the vehicle by front mounting means.

The covering means is a generally rectangular fabric which has support members positioned along its length and each support member has a pair of openings, each opening being aligned with the opening on the adjacent support members so that a series of openings are provided in which each receives one of the flexible support rods and thereby permits the fabric cover to be slid along the length of the pair of support rods. Attachment means are located at the front and rear of the fabric cover. The rear attachment means holds one end of the cover to the base means. The front attachment means is utilized when the cover is raised and is then attached to the cross-member.

The cross-member engages the front clamp means that is located on the front steering means of the vehicle. When the cross-member is brought in engagement with the front clamp means, the cover can be either extended to enclose the rider or collapsed in which case it is allowed to slide back on the flexible rods and is gathered together behind the rider on the base means.

The fabric cover has a plurality of support members which support the edges of the cover when it is extended to cover the rider.

The fabric cover is slidably attached to the flexible rods through the channels so that it can be raised and lowered without removing the flexible rods from their arched position. The front edge of the cover bears a clamp which holds the cover in contact with the windshield in the up position. The front and back attachment means of the cover are straps that allow the operator to stretch the cover taut. When not in use, the cover can be stored behind the rider by releasing the front straps and sliding the fabric cover back on the flexible rods to the back of the vehicle.

The cross-member holding the ends of the flexible support rods is clamped to release means in front of the windshield so that on impact the cross-member is released and snaps the cover up and back so that the rider does not hit the cover structure parts.

BRIEF DESCRIPTION OF THE DRAWINGS

FIG. 1 is a side elevational view of the motorcycle and the convertible top of this invention;

FIG. 2 is a front elevational view of the embodiment shown in FIG. 1;

FIG. 3 is a fragmental front elevational view of the clamp attachment which holds the convertible frame to the front of the motorcycle;

FIG. 4 is a side elevational view of the clamp shown in FIG. 3. Shown in phantom outline is the release position of the convertible top;

FIG. 5 is a top plan view of the convertible top showing support ribs in dashed line along the length of the convertible top;

FIG. 6 is a cross-sectional view taken along lines 6—6 of FIG. 5 showing a support rib and cover;

FIG. 7 is a fragmental bottom plan view of FIG. 6;

FIG. 8 is a cross-sectional view taken along line 8—8 of FIG. 7 showing a rib section;

FIG. 9 is a fragmental front elevational view showing the spring clamp mounted on the first rib and attached to the motorcycle windshield;

FIG. 10 is a side elevational view of the support frame and corresponding plate attachment on the motorcycle. Also shown in phantom outline is the cover in its down position;

FIG. 11 is a top plan view of the support frame shown in FIG. 10;

FIG. 12 is a front elevational view of FIGS. 10 and 11;

FIG. 13 is a fragmental top plan view showing the attachment flexible cover support rods attached to end rod;

FIG. 14 is a front elevational view of FIG. 13;

DETAILED DESCRIPTION OF THE DRAWINGS

Referring now more specifically to the drawings, the number 10 generally designates a modern motorcycle. The number 12 designates a portion of the motorcycle frame to which is attached a storage compartment 14. The windshield 18 is mounted on the front steering column 16. The convertible top of this invention is generally indicated by the number 20 as shown on FIG. 1 and is attached to the front end of the motorcycle 10 by a clamp 22 shown in more detail at FIGS. 3 and 4. The clamp 22 is mounted on top of the housing 24 for the light fixture 26. Bolts 28 hold the clamp 22 in its position on the housing 24 of the lamp 26. The clamp 22 has jaws 30 and 32 which clamp around cross-member 34. A spring 36 maintains tension against the jaws 30 and 32 that hold cross-member 34. The end rod 34 snaps out from the jaws 30 and 32 when there is an accident as shown in FIG. 4. This feature allows the cross-member 34 to snap up and away from the clamp and lifts the convertible top 20 up from the windshield 18. In FIG. 4, the windshield 18 is shown partially cut away behind the clamp 22.

Referring now to FIG. 5, the details of the fabric cover 40 of the convertible top 20 are shown. The ribs 42, 44, 46, 48 and 50 that provide lateral support to the edges of the fabric cover 40 are shown in dashed outline. The cover 40 also has webbing reinforcements along the side 51 and 55 and in the middle 52 and 54 and across the front 59 and the back 57. At the front end of the cover 40 are D-rings 56 and 58 and attached to D-rings 56 and 58 are straps 60 and 62. Straps 60 and 62 are utilized to hold the cover 40 to the cross-member 34 as seen in FIG. 2. At the rear of the cover are D-rings 64 and 66 and straps 68 and 70 which provide a similar function at the rear of the motorcycle 10. Conventional snap hooks 69 and 71 are attached to straps 68 and 70 and provide means to secure the rear of the cover 57 to the strap mounts 106. As shown in FIG. 9, the rib 42 in the front of the cover has a spring clamp 72 which has a soft elastomeric coating 74 and is used to hold the cover 40, when it is in the up position, to the top of the windshield 18. FIG. 8 shows a cross-section of a rib 42 which can be made of a variety of materials, and in this instance is a polyvinylchloride tube 42 filled with cured epoxy resin 2. This composite material generally provides the strength and flexibility needed in the ribs of the cover.

FIG. 6 provides a cross-sectional view of rib 42 along the line 6—6 in FIG. 5 and shows the opening 47 in the rib 42 through which the flexible rods 96 pass. The two rods 96 also pass through two openings 47 in ribs 44, 46, 48 and 50 before attaching to the cross-member 34.

The interaction of the flexible rods 96, the fabric cover 40, the ribs 42, 44, 46, 48 and 50, each rib having two openings 47, is apparent from FIGS. 2, 5, 7 and 10. The two openings 47 in each rib are aligned so that each flexible rod 96 passes through a series of aligned openings 47 in the ribs to form a straight line. It is evident that the ribs, 42, 44, 46, 48 and 50, two support rods 96 and the fabric cover 40 form a strong but flexible covering when in place.

In FIG. 7, reinforcing strap 52 is shown on the underside of the cover 40 and another reinforcing strap 51 is shown sewn into the outer edge of the cover 40 when the fabric 41 is folded over. A pocket 49 holds the end of the rib 42 and the ribs 44, 46, 48 and 50 are likewise held by pockets 49 along the edge of the cover 40. FIG. 7 also shows how the flexible rod 96 passes through an opening 47 in the rib 42.

Referring to FIGS. 10, 11 and 12, means for mounting and dismounting the convertible top is shown. Attached to the underside of compartment 14 is a mounting plate 92 which is attached by a pair of bolts 94. The mounting plate 92 is adapted to receive and hold the base mount 80. As shown in FIG. 11, the base mount 80 has a receptacle 85 which is generated by the spacer plate 86 between top plate 82 and 86. The mounting plate 92 slides into the recepticle 85 when the base mount 80 is put on the motorcycle. The top plate 82 has attached to it left rod mount 88 and right rod mount 90. Two flexible rods 96 extend from the rod mounts 88 and 90 and the other end of each rod 96 is attached to a cross-member 34 by means of bolt assembly 98 and 100. The ends of a rod 96 and their attachment to cross-member 34 by bolt assembly 100 is shown in FIGS. 13 and 14. Cross-member 34 has a recess 104. The bolt assembly 100 has an opening 97 through which the rod 96 passes. The hexagonal bolt 102 is then passed through opening 99 in cross-member 34. Wing nut 101 holds the hexagonal bolt 102 and the rod 96 in place. As shown in FIG. 13, the end of rod 96 is bent over to keep it from slipping out of the bolt assembly 100.

Referring to FIG. 10, the fabric cover 40 is shown in the collapsed position. Strap mounts 106 are located at the rear covers of top plate 82 and are the points of attachment of the snap hooks 69 and 71 shown on the fabric cover 40 in FIG. 5.

It is apparent that the particular way of attaching the cover to the rear of a bicycle-type vehicle is not the only means of mounting the invention on the vehicle and the ways described herein are illustrative and not intended to suggest these are the only modes available.

The term "bicycle-type vehicle" is used to include motorcycles, i.e., motorized bicycles including mopeds and conventional motorcycles and pedaled bicycles. It is also clear that the convertible top can be on motorized tricycles, and the term "bicycle-type vehicle" includes these forms of transportation too.

The fabric cover 40 can be made of a variety of materials including canvas, vinyl or cloth woven from any natural or synthetic fiber and any other durable material that can withstand exposure to the elements and solar radiation. The cover 40 can be either made by the conventional stitching process or with adhesives.

The support rods used in the device are of high quality steel analagous or comparable to the type of steel used in whip antennas. If whip antennas are used, they can also function to interact with a radio or communication device to receive and transmit radio signals.

The front wheel which is turned by the handlebars 8 on the motorcycle, also causes the cross-member 34 to move at the same time and the ability to turn the motorcycle is based on the overall flexibility of the steel rods 96 used in this device. For example, whenever a turn is made say to the left, the support rod 96 on the right side of the vehicle bends to the right in response to the turning of the handlebars 8 and the other support rod 96 extends, and these movements may be accompanied by some movement or flexing of the entire cover 40.

FIG. 4 shows a safety feature in that the cover 40 is designed so that its front will fly up and out of the way if a collision occurs, thereby preventing the rider of the motorcycle from hitting his head or neck on the structure of the cover 40.

The cover 40 can be utilized at all times and kept in the up position so that it provides protection from the sun and the elements. However, it is also possible to allow the cover to collapse back into the rear of the motorcycle and be carried there until such time as the rider desires to utilize it. In that particular situation, the rods 96 will remain in place in the accurate configuration shown in FIG. 1.

Another feature of the invention is if the rider does not desire to carry the cover for some reason, it is easily dismounted by removing the base mount 80 from the plate 92 and storing it until such time as the rider decides to have the cover 40 available to him. As shown in FIG. 10, this will result in all but the base mount 92 being removed.

While preferred embodiments of the invention have been described, it is appreciated that variations and modification may be made without departing from the spirit of this invention.

It is claimed and desired to secure by Letters Patent:

1. A convertible top for a motorcycle vehicle having front steering means comprising:
    (a) Rear mounting means at rear of the vehicle;
    (b) Base means which are adapted to engage the rear mounting means;
    (c) At least two flexible rods, each of which is vertically attached at one end to the base means and positioned over the left and right side of the rear of the vehicle;
    (d) A cross-member attached to the other end of the flexible rods so that the rods are maintained in parallel alignment to the longitudinal axis of the vehicle;
    (e) A fabric cover having a top end and back end and said cover having a plurality of lateral support members each of which has two side openings, said openings in each support member being aligned with an opening on an adjacent support member whereby each of the flexible support rods are passed through each of the openings on one side of the lateral support members and the lateral support members slidably engage the flexible support rods thereby allowing the fabric cover to be raised and lowered to provide covering over the vehicle rider;
    (f) Attachment means at the front and rear of the fabric cover for attaching the fabric cover to the cross member and the base means; and
    (g) Front mounting means on the front steering means of the vehicle, said front means being adapted to engage and hold the cross-member and thereby hold the flexible rods and the fabric cover in an arcuate configuration over the vehicle rider.

2. A device as in claim 1 wherein the convertible top is detachably mounted to the rear mounting means.

3. A device as in claim 1 wherein the front mounting means are adopted to release the cover when the vehicle collides with another object.

4. A device as in claim 1 wherein the fabric cover has a clamp adapted to hold the front edge of the cover to a windshield on the motorcycle.

* * * * *